United States Patent [19]

Kovacich et al.

[11] Patent Number: 5,264,820
[45] Date of Patent: Nov. 23, 1993

[54] DIAPHRAGM MOUNTING SYSTEM FOR A PRESSURE TRANSDUCER

[75] Inventors: John A. Kovacich, Wauwatosa, Wis.; Christopher C. Hoinsky, Huntington, Conn.; Peter D. Van Vessem, Beacon Falls, Conn.; Ricardo A. Rago, Bethel, Conn.

[73] Assignee: Eaton Corporation, Cleveland, Ohio

[21] Appl. No.: 860,860

[22] Filed: Mar. 31, 1992

[51] Int. Cl.⁵ ............................................. H01C 10/10
[52] U.S. Cl. ....................................... 338/42; 338/4; 338/5; 338/47; 338/36; 73/727; 73/48; 73/862.474
[58] Field of Search .................. 338/4, 5, 36, 42, 47; 73/727, 726, 725, 862.47, 862.48

[56] References Cited

U.S. PATENT DOCUMENTS

| | | |
|---|---|---|
| 3,397,278 | 8/1968 | Pomerantz . |
| 3,697,917 | 10/1972 | Orth et al. ............................ 338/2 |
| 4,127,840 | 11/1978 | House ................................... 338/4 |
| 4,295,115 | 10/1981 | Takahashi et al. ................... 338/4 |
| 4,499,774 | 2/1985 | Tsuchiya et al. .................... 73/727 |
| 4,771,639 | 9/1988 | Saigusa et al. ...................... 73/727 |
| 4,918,992 | 4/1990 | Mathias ................................ 73/727 |
| 4,972,716 | 11/1990 | Tobita et al. ......................... 73/721 |
| 4,994,781 | 2/1991 | Sahagen ............................... 338/47 |

FOREIGN PATENT DOCUMENTS 0390619  3/1990  France .

OTHER PUBLICATIONS

IEEE 1985 International Conference of Solid-State Sensors and Actuators, Digest of Technical Papers, E. Obermeier, "Polysilicon Layers Lead to New Generation of Pressure Sensors", p. 430 (1985).

Primary Examiner—Marvin M. Lateef
Attorney, Agent, or Firm—L. H. Uthoff

[57] ABSTRACT

A pressure transducer for measuring high differential pressure media in a harsh environment where a diaphragm assembly is mounted to an intermediate support number which is mounted to a main support member where the high pressure media impinges on the diaphragm to create a force opposing that provided by the diaphragm support structure thereby loading the diaphragm in compression. The strain sensitive piezoresistive elements are protected and sealed from the low pressure media by a passivation layer and electrical signal leads are attached to bonding pads formed on the diaphragm assembly which are sealed to the intermediate support member by a sealing cap.

19 Claims, 4 Drawing Sheets

DIAPHRAGM MOUNTING SYSTEM FOR A PRESSURE TRANSDUCER

RELATED APPLICATIONS

This application is related to application U.S. Ser. No. 07/709,551 entitled "Hermetic Mounting System for a Pressure Transducer" assigned to the same assignee, Eaton Corporation, as this application and filed on Jun. 3, 1991 now U.S. Pat. No. 5,186,055.

FIELD OF THE INVENTION

The present invention relates to pressure sensing transducers of the type utilizing strained sensitive elements formed in a flexible diaphragm subjected to a pressure to be measured. More particularly, the present invention relates to an improved diaphragm assembly mounting arrangement by which the diaphragm can be exposed to a high differential pressure without fracture due by mounting the diaphragm such that it is compressively loaded by the media and sealing the media passageways from one another and on each side of the diaphragm element.

DESCRIPTION OF THE PRIOR ART

Semiconductor pressure transducers have a wide range of applications including industrial and aerospace where accurate pressure monitoring is required especially under harsh environments. These applications also frequently require the accurate pressure monitoring of high differential pressure media which can easily overstress pressure transducer elements thereby causing failure. Also, these applications frequently require the measurement of high pressure media where the media is a corrosive or chemically reactive solution or gas which attacks elements of the pressure transducer thereby causing failure or nonlinearity of the pressure measurement.

Semiconductor pressure transducers using silicon, sapphire or other crystal or diaphragms offer many potential advantages in such applications due to their small size, absence of moving parts and potential for sensitivity and accuracy. However, the prior art method of securing a silicon, sapphire or crystal diaphragm to a support element has been unsatisfactory for use in a high differential pressure environment or where a high degree of sealing is required between the media passageways and on both sides of the diaphragm.

The typical semiconductor pressure transducer basically consists of a pressure force collector diaphragm having one or more electrical strain sensitive elements such as piezoresistors or one or more capacitors mounted thereon which change electrical characteristics with the deflection of the diaphragm. Such changes in the diaphragm result in electrical changes of the strained sensitive elements which are detected, amplified and relayed to various instrumentation which communicates the pressure history of the monitored system.

In one prior art approach, dopant silicon piezoresistive elements are formed directly on a force collector diaphragm of single crystal silicon. Since the silicon piezoresistive film is integral to the silicon diaphragm, the piezoresistive film is essentially an atomic extension of the diaphragm and has the same crystalline structure. This results in very effective bonding with no hysteresis effect. Additionally, the piezoresistive elements may be formed in specific orientation according to the needs for the particular transducer such as that known as a Wheatstone Bridge configuration. The piezoresistive elements may be formed on the diaphragm using techniques well known in the art such a doping, masking, and etching.

A sapphire material has been used as a diaphragm and is described in U.S. Pat. No. 4,994,781, the disclosure of which is incorporated herein by reference. A second prior art approach is to use a diaphragm assembly configuration referred to as silicon-on-insulator. In this method, an insulating oxide layer is created between two layers of single crystal silicon. One of the layers of silicon is very thin, while the second layer is relatively thick. The pressure sensitive diaphragm is formed in the thicker silicon layer while a plurality of strain gauges are formed in the thinner layer using techniques such doping, masking, and etching. The rest of this thin silicon layer is etched away, leaving the strain gauges as di-electrically isolated islands on the silicon diaphragm.

To utilize a silicon or sapphire diaphragm in pressure transducers, it is necessary to suitably mount the diaphragm in a housing adapted to be connected to a source of pressure to be measured such as a fluid or gas. For many industrial and aerospace applications, the media pressures and temperatures are so extreme that a rugged mounting and sealing arrangement for the pressure sensing diaphragm is required such as that disclosed in U.S. patent application U.S. Ser. No. 07/709,551 entitled "Hermetic Mounting System for Pressure Transducer" filed on Jun. 3, 1991 now U.S. Pat. No. 5,816,055, the disclosure of which is incorporated herein by reference. Using this method the diaphragm is mounted on a silicon and borosilicate glass support structure where the thermal expansion coefficient of the support matches that of the diaphragm assembly so that temperature induced stress and strains are minimized. Also, a special method is used to seal the support structure to the housing using a sealing glass where the coefficient expansion of the various components are carefully selected so as to maintain the required sealant while minimizing stress.

Another limitation in the prior art is the integrity of the diaphragm when subjected to high differential pressures. Heretofore, the diaphragm would be subjected to extraordinarily high tensile stresses which would result in fracture of the diaphragm element and failure of the transducer. This limited the application of the use of a crystalline diaphragm to low differential pressures where the tensile strength of the diaphragm limited the application.

Due to the deficiency of the prior art, a need presently exists for an improved type of pressure sensor that employs a new type of diaphragm mounting system so that the diaphragm assembly is subjected to high pressures that result in a compressive rather than a tensile loading of the assembly for improved life and extended pressure ranges with high gain, small size and accurate measurement accuracy over a wide range of pressure.

Another limitation of the prior art is the ability to effectively seal the circuit elements such as a piezoresistive element etched in a surface of the crystalline diaphragm from the corrosive media such as rocket fuel which would destroy the circuit. One method to separate the circuit from the corrosive media is to use an oil and a second diaphragm where the high pressure media impinges the second diaphragm which in turn acts upon the oil to transfer the pressure to the diaphragm containing the sensitive circuit elements. The problem with this approach is that the oil has its own temperature expansion characteristics which results in measurement inaccuracies as the temperatures vary. In addition, bubbles in the oil in the form of dissolved gases affects the linearity. Another problem is that at very low temperatures, the oil viscosity increases to such an extent that a large amount of viscous damping is introduced causing measurement inaccuracies and slow response. Thus, the need presently exists for an effective method of sealing the sensitive circuit elements such as a piezoresistor from a corrosive or another damaging media whose pressure is to be measured.

SUMMARY OF THE INVENTION

The present invention provides an improved method of physically mounting a diaphragm element to a support element to make use of its inherent higher strength in compression as opposed to tension while providing for effective sealing of the electrical interconnects and the piezoresistive elements. The diaphragm assembly is anodically bonded to an intermediate support member which is in turn anodically bonded to a silicon main support member. The assembly is then mounted to the transducer housing by way of a sealing glass material. More specifically, the diaphragm element is physically reversed in operation as compared to the prior art where the high pressure media now impinges the diaphragm in a direction toward the intermediate and main support member. By orienting the diaphragm such that the high pressure media impinges the face of the diaphragm opposite to the side supported by the intermediate and main support element, the structure of the diaphragm is approximately 10 times as strong thereby providing for a much higher maximum differential operating pressure.

The sensed high pressure media comes in direct contact with the diaphragm for improved measurement accuracy where the circuit elements are formed on the opposite side of the diaphragm and are protected from the low pressure media by a passivation layer where all of the electrical components are coated except where wires attach the bonding pads. The bonding pads also function as a seal against the intermediate support member where a metal such as gold is used to form the seal with forces generated by anodic bonding of the outer diameter of the diaphragm to the intermediate member. The anodic bonding generates a sealing force between the gold coated bonding pad and the intermediate member which forms a very effective seal to prevent the lower pressure media from escaping into the electrical signal leads or circuit elements.

A cavity formed on the side of the intermediate support member that is directly opposed to the diaphragm contains a depression allowing the diaphragm to flex and deform upon introduction of a high pressure media to the opposite face. The cavity can be shaped to effectively stop the movement of the diaphragm prior to fracture due to excessive high pressure media introduction of the opposite side.

A tube is used to channel the low pressure media to the side of the diaphragm opposite that experiencing the high pressure media, the tube is preferably made up of a special metal such as that has a very low coefficient of expansion to match that of the silicon main support member.

Multiple holes are ultrasonically milled into a silicon tube which functions as the main support member where the multiplicity of holes allow for the routing of the interconnect leads from the active element bonding pads to the outside surface of the main housing for connection to the instrumentation required to power and measure the strains introduced in the diaphragm.

The active elements of the diaphragm consist of a plurality of piezoresistive elements which are formed in an epitaxial layer that is used for the circuit in sealing.

With the use of the foregoing improvements over the prior art for mounting a diaphragm to a support member, high pressure media can be introduced directly onto the face of the diaphragm without risk of damage to either the diaphragm structure or the active electrical elements mounted thereon. This provides for a pressure sensing transducer that can operate in a high pressure, high temperature environment where the media is damaging to the traditional pressure transducer components.

DETAILED DESCRIPTION OF THE PREFERRED EMBODIMENT

Figure 1:
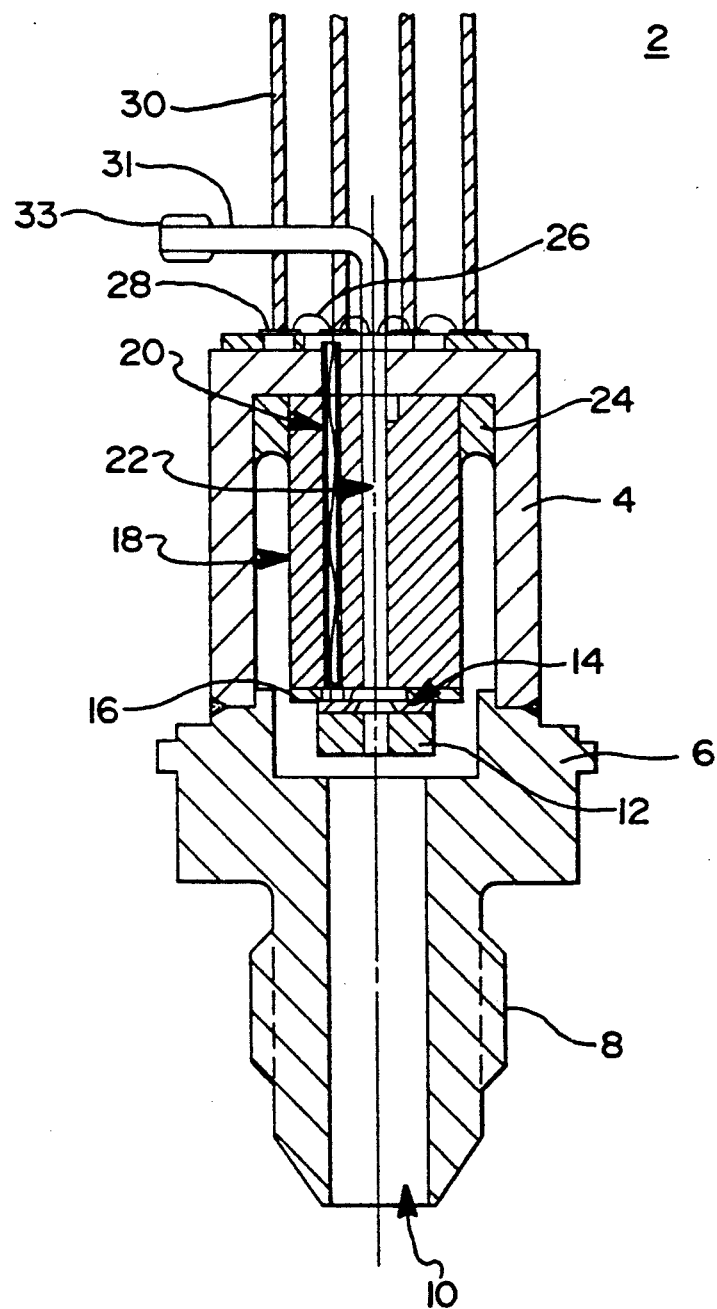
FIG. 1 is a cross-sectional view of the preferred embodiment of the present invention.

Referring to FIG. 1, a cross-section of the preferred embodiment of the pressure transducer 2 of the present invention is shown. The pressure transducer 2 is made up of a main housing 4 which is attached to an end housing 6 where the materials commonly used for both the main housing 4 and the end housing 6 are stainless steel and the two are attached one to the other by welding preferably by electron beam welding. The end housing 6 has a threaded portion 8 for mounting the pressure transducer 2 to a system containing a media whose pressure is to be measured where the threaded portion 8 engages a section of the system whose media pressure is to be measured containing a section of mating threads. The end housing 6 also contains an inlet cavity 10 which allows for the introduction of the high pressure media to the internal sections of the pressure transducer 2.

The high pressure media impinges on diaphragm member 14 which can be made of a crystalline material such as silicon on which a plurality of piezoresistive elements are epitaxially formed as discussed in a previous section of this application. The diaphragm member 14 is bonded to a support block 12 which has a passageway which allows the high pressure media to strike the diaphragm member 14 causing the diaphragm member 14 to deflect. The diaphragm member 14 is anodically bonded to an intermediate support member 16 which can be made of a borosilicate glass material such as PYREX as supplied by Corning Glass Works. Bonding of the various elements may be provided by a number of techniques such as by using an epoxy adhesive, glass bond, or an electrostatic bond known in the art as anodic bonding as described in U.S. Pat. No. 3,397,278, the disclosure of which is hereby incorporated by reference.

Using a similar technique, the intermediate support member 16 is bonded to a main support member 18 both of which contain a passageway 22 which establishes a conduit for a low pressure media to impinge the opposite side of the diaphragm member 14 as the high pressure media. The main support member 18 also contains a plurality of lead passageways 20 (only one is shown in FIG. 1) which permit an electrical interconnect signal lead 26 to be routed through the main support member 18 into the outside of the main housing 4 for bonding to a plurality of individual connector pads 28 which are then connected to a plurality of electrical connectors 30 for connection to instrumentation for displaying the sensed differential pressure. The support plate 16 contains a like plurality of passageways which are aligned with the lead passageways 20.

The main support member 18 is mounted to the main housing 4 with a sealing glass 24 using the techniques discussed in U.S. Pat. No. 5,186,055 entitled "Hermetic Mounting System for a Pressure Transducer" filed on Jun. 3, 1991, the disclosure of which is hereby incorporated by reference. The sealing glass 24 is of a content similar to that made by Schott Glaswerke, a composite soldered glass, part no. GO17-339 which can be supplied as a glass preform or in bulk as a glass powder. The sealing glass 24 functions to mechanically support the main support member 18 and also to hermetically seal the high pressure media from the low pressure media within the pressure transducer 2.

Figure 2:
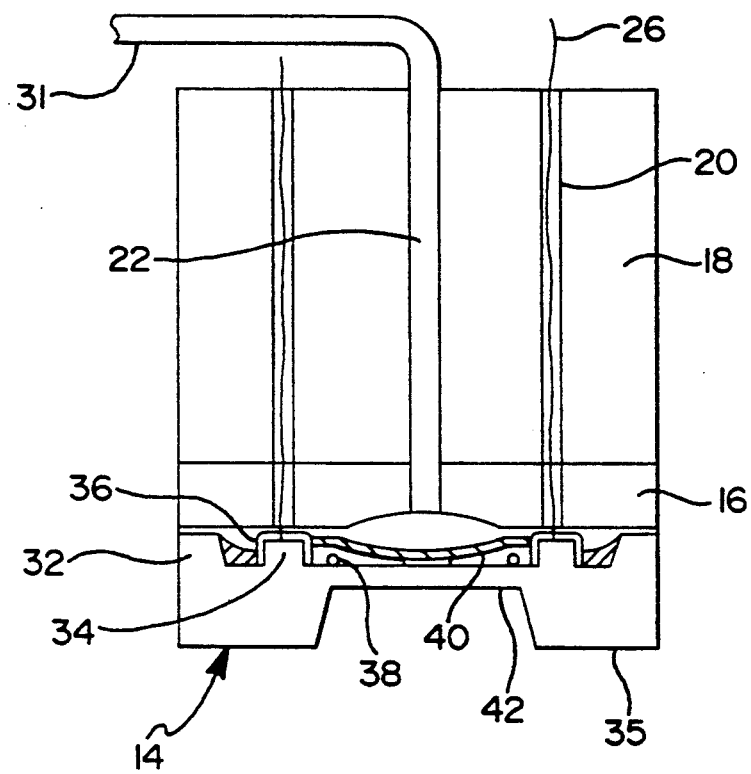
FIG. 2 is a cross-sectional view of the present invention showing the silicon diaphragm mounted to the intermediate support member which is mounted to the main support member.

Now referring to FIG. 2, which shows a cross-sectional view of the diaphragm member 14, the diaphragm support member 14 includes a diaphragm seal ring 32, a plurality of bonding pads 34 and a support face 35. The support face 35 is anodically bonded to the support block 12 where the support block 12 is commonly made of a borosilicate glass material such as and includes a passageway through the center for introduction of the high pressure media to the diaphragm 42. The diaphragm member 14 includes a thinner section which functions as a diaphragm 42 formed so as to deform upon application of an unbalanced pressure experienced by one side of the diaphragm 42 as compared to a second side. A variety of alternate diaphragm materials can be used in place of silicon, an example being sapphire, and any reference to silicon is to encompass all types of diaphragm materials.

The diaphragm 42 has a relatively thin cross-section so that the fluid being monitored causes the diaphragm 42 to flex thus inducing strain at the diaphragm 42 surface. The diaphragm 42 has a thin layer of oxide deposited that acts as an electrical insulator, where a thin film of strain sensitive elements 38 are formed or deposited on the oxide substantially symmetrically located about the center axis of the diaphragm 42 so that the flexing of diaphragm 42 causes the strain sensitive elements 38 to change electrical characteristics. Electrical signals from strain sensitive elements 38 are conducted along a plurality of connecting wires which are more clearly seen by way of reference to FIG. 4 and are labeled as element leads 44 which are wire bonded to a plurality of connector pads 28 formed on the surface of and formed part the diaphragm member 14. The connector pads 28 are covered by a layer of deformable metal such as gold to form a sealing cap 36.

The element leads 44 are bonded to the bonding pads 34 which in turn are connected to the plurality of signal leads 26 which pass through lead passageways 20 formed by ultrasonic milling of the main support member 18. The main support member 18 is formed of a silicon material which is ultrasonically machined to the proper size and shape including the aforementioned lead passageways 20 and the pressure passageway 22.

The intermediate support member 16 which can be made of borosilicate glass material or any other material that is suitable for bonding to the main support member 18 and to the diaphragm assembly 14 also has a plurality of lead passageways 20 formed so as to be in alignment with the similar lead passageways 20 formed in the main support member 18 which in turn are in alignment with the bonding pads 34 formed on the surface of the diaphragm member 14.

The low pressure media travels through the pressure passageway 22 which is routed externally to the pressure transducer 2 through the low pressure tube 31 to the pressure passageway 22 and to the diaphragm 42 and opposes the pressure executed on diaphragm 42 by the high pressure media. The piezoresistive elements 38 are protected from impingement of the low pressure media by way of a passivation layer 40 which can be made of a silicon nitride or a silicon oxide material which extends to cover the low pressure side of the diaphragm 42 except for the diaphragm seal ring 32 and the bonding pads 34. The low pressure tube 31 can be made of a metal material known commercially as Kovar which has a coefficient of expansion with temperature that matches that of the silicon main support member 18. Tube 31 is joined to the sources of low pressure with pressure fitting 33. The function of the passivation layer 40 is to protect the piezoresistive elements 38 from damage due to the characteristics of the low pressure media. The direction of the deflection of the diaphragm 42 directly opposes the support provided by the intermediate support member 16 and the main support member 18 which puts the diaphragm member 14 in compressive stress.

Figure 3:
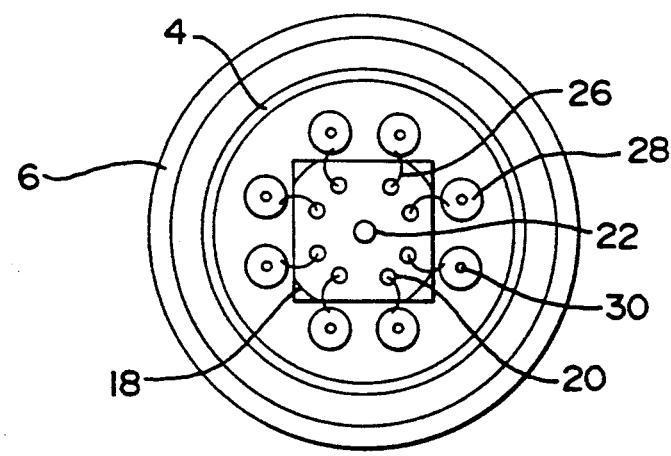
FIG. 3 is a top view of a preferred embodiment of the main support member of the present invention showing the electrical interconnects attached to the connector pads.

Now referring to FIG. 3, a top view of the pressure transducer 2 of the present invention is shown with the top of the main support member 18 shown in solid rather than dashed lines. The main support member 18 is shown with a plurality of lead passageways 20 which contain a like plurality of signal leads 26 which at one end are connected to the bonding pads 34 (not shown) and travel through the lead passageways 20 up through the intermediate support 16 and the main support member 18 and are bonded to a like number of connector pads 28. The connector pads then support a like number of electrical connectors 30 which extend and are connected to external instrumentation which functions to supply power to and process signals received from the pressure transducer 2. Also shown in solid lines are the end housing 6 and the main housing 4 which surround and protect the internal elements of the pressure transducer 2. The diaphragm member 14 will fail at low tensile stress levels but has a much greater compression stress level limit. By mounting the diaphragm member 14 in the orientation disclosed herein, much higher differential pressure can be tolerated and measured with excellent linearity and accuracy.

Figure 4:
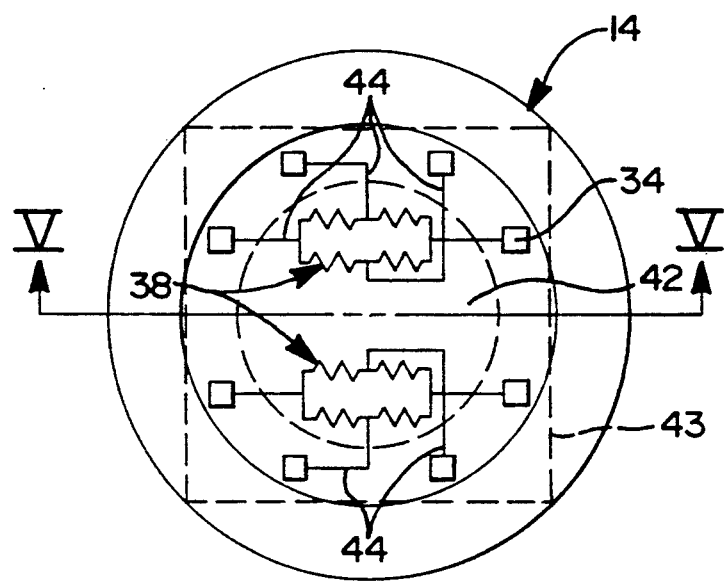
FIG. 4 is a top view of the diaphragm of the present invention showing the piezoresistive elements connected to the bonding pads.

FIG. 4 shows a top view of the diaphragm member 14 with the piezoresistive elements 38 mounted thereon using a screening and etching process to form the piezoresistive elements 38 onto the diaphragm 42 or using an epitaxial technique for formation of the active elements in the oxide layer 43. The outputs of the piezoresistive elements 38 are electrically attached to the bonding pads 34 through a plurality of element leads 44 such that the piezoresistive elements 38 are arranged and interconnected to operate with the proper electrical power and signal conditioning to match what is known in the art as a Wheatstone Bridge. Upon deformation of a diaphragm 42 strains are introduced into the surface causing the resistance value of the piezoresistive elements 38 to be changed such that an electrical signal can be produced which is representative of the pressure differential across the diaphragm 42.

Figure 5:
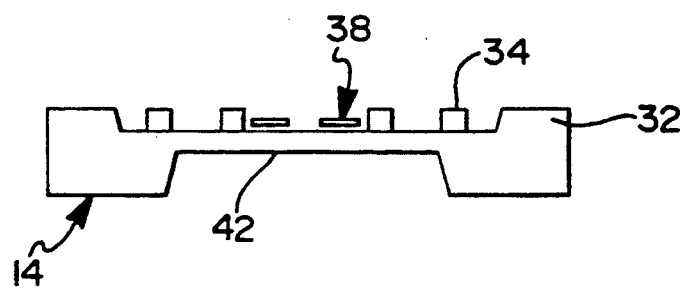
FIG. 5 is cross-sectional view V—V of the diaphragm of FIG. 4 of the present invention showing a plurality of piezoresistive elements mounted thereon.

FIG. 5 is a cross-sectional view of the diaphragm member 14 with the piezoresistive elements 38 mounted thereon. Also shown is the diaphragm seal ring 32 which is positioned along the outside diameter of the diaphragm member 14 and is anodically bonded to the intermediate support member 16. Also shown is the plurality of bonding pads 34 which are covered with a layer of malleable metal material which make up the sealing cap 36 onto which the element leads 44 are attached and where the signal leads 26 are secured to the bonding pads 34 and extend upwards through the lead passageways 20 in the intermediate support member 16 and the main support member 18. The malleable metal sealing cap 36 which covers the bonding pads 34 effectuate a pressure seal between the intermediate support member 16 and the lower pressure media that exists in the pressure passageway 22. The anodic bonding of the diaphragm seal ring 32 to the intermediate support member 16 causes a compressive force to be introduced on the metal covering making up sealing cap 36 (as shown in FIG. 2). In addition, a polymer material is introduced into the lead passageways 20 to provide for additional sealing of the lower pressure media from the ambient environment.

Figure 6:
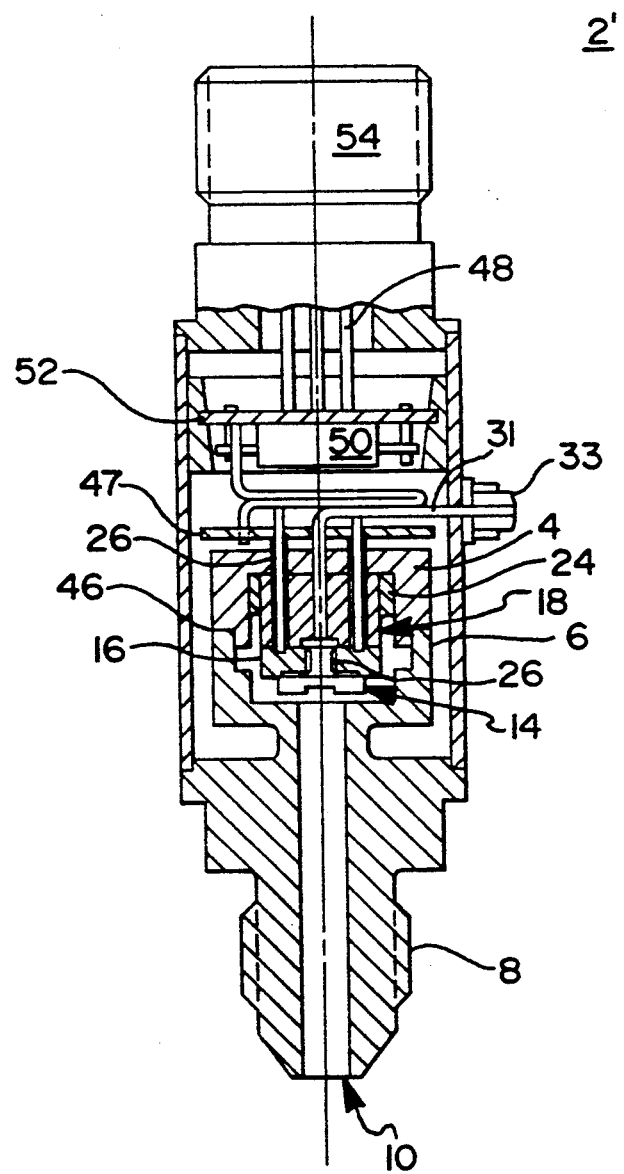
FIG. 6 is a cross-sectional view of an alternative embodiment of the present invention.

Now referring to FIG. 6, an alternative embodiment of the present invention is shown which makes use of a silicon on sapphire diaphragm 42 similar to that shown in FIG. 1. The diaphragm element 14 is positioned such that the high pressure media introduced into the inlet cavity 10 impinges on the underside of the diaphragm 42 producing a movement towards the support provided by the intermediate support member 16 and the main support member 18. The diaphragm assembly 14 is fabricated in a similar manner as that previously described and shown in FIGS. 2 and 4. Rather than being routed through a plurality of lead passageways 20, the signal leads 26 are bonded to the bonding pads 34 which are then covered with a passivation layer 40 and extend through the pressure passageway 22 in the intermediate support member 16 and the extend so as to attach to the signal leads 26 which extend through the lead passageways 20 that are formed in the main support member 18 which then extend upward and are bonded to the intermediate connection board 47. The lower differential pressure source is attached to the pressure fitting 33 which introduces an intermediate differential pressure into the low pressure tube 31 where it is routed to the low pressure side of the diaphragm assembly 14.

The output signals carried by the signal leads 26 are then attached to a connecting wire that leads to the primary circuit board 52 which includes a signal conditioning circuitry 50. After conditioning the electrical signal is routed to external instrumentation through the electrical output leads 48 where the electrical connection is made by a standard electrical connector 54.

The diaphragm assembly 14 consists of a silicon insulator construction for a sapphire on silicon construction method which is well known in the art. The sealing of the diaphragm to the intermediate support member is by anodic bonding where the circuit elements are protected from the low pressure media by a passivation layer 40. The main support member is mounted and sealed to the main housing 4 with a sealing glass 24 as described supra.

It will be appreciated by those of ordinary skill in the art that many variations of the foregoing embodiment are possible or remaining within the scope of the present invention. The present invention should thus not be considered limited to the preferred embodiments of the specific choices of material, configurations, dimensions, applications or arranges of parameters employed therein.

What is claimed is:

1. A pressure transducer for measuring high pressures in a harsh environment comprising:
   a first transducer housing member having a passageway adapted to be connected to a source of pressure to be measured;
   a second transducer housing member having walls and joined to said first transducer housing member, said second transducer housing member forming a cavity;
   a diaphragm having a relatively thin, constant thickness, center section, said center section being flexed in response to variations of the pressure to be measured, having disposed on a first side of said center section a strain sensitive element where said center section is attached to and supported by a thicker annular diaphragm support portion disposed on the periphery of said center section, where said first side of said diaphragm support portion is substantially coplanar with said diaphragm and where said second side is exposed to said source of pressure to be measured;
   an intermediate support member formed of an electrically insulating glass for supporting said diaphragm attached to said diaphragm support portion, said intermediate support member having a first end and a second end with a plurality of passageways extending from said first end to said second end, said first side of said diaphragm support portion bonded to said first end of said intermediate support member where said diaphragm is in substantial alignment with one of said intermediate support member passageways;
   a main support member having a first end and a second end with a plurality of passageways extending from said first end to said second end and in substantial alignment with said plurality of passageways in said intermediate support member where said second end of said intermediate support member is bonded to said first end of said main support member, said second end of said main support member is attached to said second transducer housing member such that said diaphragm, said intermediate support member and said main support member are enclosed by said cavity.

2. The pressure transducer of claim 1, wherein a support block having an axial hole therein is bonded to said second side of said diaphragm support portion where said axial hole is in substantial alignment with said diaphragm.

3. The pressure transducer of claim 1, further comprising:
   a raised sealing member formed on said first side of said diaphragm support portion, said sealing member covered with a malleable metal sealing cap where said sealing cap forcibly contacts said first end of said intermediate support member and said sealing member and where an electrical connector passes through and is surrounded by said sealing cap;
   a passivation layer covering said center section of said diaphragm extending up to said sealing members.

4. The pressure transducer of claim 1, wherein said second end of said main support member is bonded to said second transducer housing member using a sealing glass.

5. The pressure transducer of claim 4, wherein said main support member is formed of silicon.

6. The pressure transducer of claim 1, wherein said strain sensitive element is a plurality of piezoresistive elements formed on an oxide layer on said first side of said center section of said diaphragm.

7. The pressure transducer of claim 1, further comprising:
   a tube having a first end connected to a reference pressure source and a second end connected and sealed to one of said passageways in said main support member.

8. The pressure transducer of claim 1, wherein said intermediate support member is made of a borosilicate glass material.

9. The pressure transducer of claim 1, wherein said second end of said intermediate support member is anodically bonded to said second end of said main support member.

10. The pressure transducer of claim 9, wherein said first end of said intermediate support member is anodically bonded to said diaphragm support portion.

11. The pressure transducer of claim 1, wherein a support block is anodically bonded to said second side of said diaphragm support portion, said support block having a passageway allowing the high pressure to reach said diaphragm.

12. A pressure transducer for measuring the difference between a reference pressure and a high pressure comprising:
   a diaphragm including a small thickness portion having a first and second surface and a great thickness portion having a first and a second surface disposed on the periphery of said small thickness portion, said small thickness portion being of a relatively constant thickness, said first surface of said small thickness portion being substantially coplanar with said first surface of said great thickness portion where said second surface of said small thickness portion of said diaphragm is exposed to the high pressure;
   a plurality of pressure detecting resistors formed in said first surface of said small thickness portions;
   an intermediate support member formed of an electrically insulating glass having a first end and a second end and a plurality of passageways extending from said first end to said second end where said first end of said intermediate support member is bonded to said second surface of said great thickness portion;
   a main support member having a first end and a second end and a plurality of passageways extending from said first end to said main second end where said first end of said main support member is bonded to said second end of said intermediate support member and where said plurality of passageways in said main support member are in substantial alignment with said plurality of passageways in said intermediate support member where one of said passageways in said main support member is connected to the reference pressure.

13. The pressure transducer of claim 12, further comprising a first transducer housing member having a passageway adapted to be connected to said high pressure; said passageway directing said high pressure to said second surface of said small thickness portion; a second transducer housing member having walls forming a cavity therewith and joined to said first transducer housing member where said diaphragm and said intermediate support member and said main support member are disposed within said cavity.

14. The pressure transducer of claim 12, further comprising a support block bonded to said second surface of said great thickness portion, said support block formed of a borosilicate glass having a passageway therethrough for directing said high pressure to said second surface of said small thickness portion of said diaphragm.

15. The pressure transducer of claim 12, wherein said plurality of pressure detecting resistors are connected to form a Wheatstone Bridge.

16. The pressure transducer of claim 12, wherein said intermediate support member is formed of a borosilicate glass.

17. The pressure transducer of claim 12, wherein said main support member is formed of a silicon material.

18. The pressure transducer of claim 12, wherein said first end of said intermediate support member is anodically bonded to said second surface of said great thickness portion and where said first end of said main support member is anodically bonded to said second end of said intermediate support member.

19. The pressure transducer of claim 12, further comprising a glass section joining and sealing said second end of said main support member to said second transducer housing member.

* * * * *